(12) United States Patent
Currie

(10) Patent No.: US 10,669,973 B2
(45) Date of Patent: Jun. 2, 2020

(54) ROTATING, SELF-EXCITED, ASYMMETRIC RADIO FREQUENCY RESONANT CAVITY TURBINE FOR ENERGY STORAGE AND POWER PRODUCTION

(71) Applicant: Andrew Currie, Ludington, MI (US)

(72) Inventor: Andrew Currie, Ludington, MI (US)

( * ) Notice: Subject to any disclaimer, the term of this patent is extended or adjusted under 35 U.S.C. 154(b) by 0 days.

(21) Appl. No.: 15/289,967

(22) Filed: Oct. 11, 2016

(65) Prior Publication Data

US 2017/0114757 A1 Apr. 27, 2017

Related U.S. Application Data

(60) Provisional application No. 62/244,526, filed on Oct. 21, 2015.

(51) Int. Cl.
| | | |
|---|---|---|
| *F02M 27/04* | (2006.01) | |
| *H02K 99/00* | (2014.01) | |
| *H02K 7/18* | (2006.01) | |
| *H02K 7/08* | (2006.01) | |
| *F16C 32/04* | (2006.01) | |

(52) U.S. Cl.
CPC ........... *F02M 27/04* (2013.01); *H02K 7/1823* (2013.01); *H02K 99/00* (2016.11); *F16C 32/0489* (2013.01); *F16C 2360/00* (2013.01); *H02K 99/10* (2016.11); *H02K 99/20* (2016.11); *Y10S 74/09* (2013.01)

(58) Field of Classification Search
CPC ...... F02M 27/04; H02K 7/1807; H02K 53/00; F16C 32/0406; Y10S 74/09
See application file for complete search history.

(56) References Cited

U.S. PATENT DOCUMENTS

| 201,400 | A | | 3/1878 | Everhart | |
|---|---|---|---|---|---|
| 4,891,600 | A | * | 1/1990 | Cox | ........................ F03H 99/00 250/251 |

(Continued)

FOREIGN PATENT DOCUMENTS

GB     2493361 B     9/2017

OTHER PUBLICATIONS

Anomalous Thrust Production from an RF Test Device Measured on a Low-Thrust Torsion Pendulum, David Brady, Harold White, Paul March, James Law Rence, Frank Davies, Nasa Lyndon B. Johnson Space Center,Houston,Tex.77058.

*Primary Examiner* — Michael C Zarroli

(57) ABSTRACT

Disclosed is a new classification of Turbine Prime Mover, capable of producing high magnitudes of rotational speed, potential rotating energy and power production. The invention is a rotating machine adapted to be propelled by the net force created by asymmetric radio frequency resonant cavities (7). The turbine employs thrusters (7) electrically driven by microwave signals produced from adapted Klystron Tubes (3). By optimizing microwave production, and thruster pressures via the internal radio frequency cavity resonance, power in the field of the thruster by wave tube amplification, internal reflectivity and cooling, the principles of rotor-dynamics are applied to produce a new class of energy storage machine. Low power inputs yield high energy magnitudes over time accumulated thruster operation in the rotor. The turbine rotor is capable of acting as a prime mover for energy injection into a rotor mass, or can create real work by outputting rotational energy into torque.

7 Claims, 2 Drawing Sheets

(56) References Cited

U.S. PATENT DOCUMENTS

Figure 1:
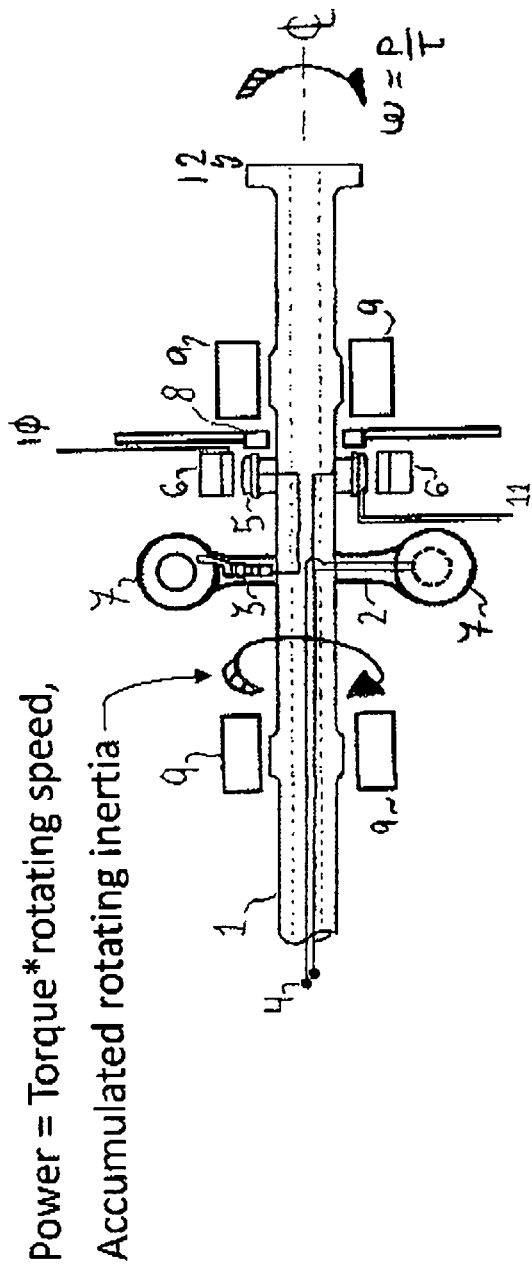

| | | | | |
|---|---|---|---|---|
| 5,956,938 A | * | 9/1999 | Brandenburg | F03H 1/00 60/203.1 |
| 6,163,112 A | * | 12/2000 | Ponard | H01J 23/213 315/5.47 |
| 6,293,090 B1 | * | 9/2001 | Olson | F03H 1/0081 313/231.31 |
| 9,797,309 B2 | * | 10/2017 | Podrog | F02C 1/05 |
| 10,144,532 B2 | | 12/2018 | Pais | |
| 2005/0007001 A1 | * | 1/2005 | Imholt | B82Y 10/00 313/231.31 |
| 2005/0109879 A1 | * | 5/2005 | Patterson | F03H 99/00 244/53 R |
| 2008/0093506 A1 | * | 4/2008 | Emsellem | F03H 1/0081 244/169 |

\* cited by examiner

ROTATING, SELF-EXCITED, ASYMMETRIC RADIO FREQUENCY RESONANT CAVITY TURBINE FOR ENERGY STORAGE AND POWER PRODUCTION

This application claims the benefit of provisional patent application Ser. No. 62/244,526, filed 2015 Oct. 21, by the present inventor.

BACKGROUND

Field of Invention

The present invention relates to the technical field of rotating electrical machines, in particular high speed (Greater than 1000 rpm) Rotor Generators and Turbine Shaft Systems utilized in the utility power production field.

Prior Art

The following is a tabulation of some prior art that presently appears relevant:
U.S. Patents

| Publication Nr. | Kind Code | Publ. Date | Applicant |
| --- | --- | --- | --- |
| US20140013724 | A1 | 2014 Jan. 16 | Guido P. Fetta |

Nonpatent Literature Documents

"Anomalous Thrust Production from an RF Test Device Measured on a Low-Thrust Torsion Pendulum", David Brady, Harold White, Paul March, James Lawrence, Frank Davies, NASA Lyndon B. Johnson Space Center, Houston, Tex. 77058.

"Net thrust measurement of propellantless microwave thrusters", Yang Juan, Wang Yuquan, Li Pengfei, Wang Yang, Wang Yunmin, Ma Yanjie, Northwestern Polytechnical University, College of Aeronautics, Xi'an 710072) (Received Jun. 9, 2011; revised manuscript received Oct. 25, 2011).

"Second generation EMDrive propulsion applied to SSTO launcher and interstellar probe", Roger Shawyer, Acta Astronautica Volume 116, November-December 2015 Pages 166-174.

"Direct Thrust Measurements of an EMDrive and Evaluation of Possible Side Effects", Martin Tajmar, Institute of Aerospace Engineering, Technical University of Dresden, 11062 Dresden, Germany.

"NASA confirms that the 'impossible' EmDrive thruster really works, after new tests", By Rick Stella. Article located at http://www.digitaltrends.com/cool-tech/researchers-conduct-successful-new-tests-of-emdrive.

Production of rotating energy via a prime mover to power a shaft system or a rotating generator is typically limited to mass impulse, fluid pressure reaction turbines, or a combination thereof. Typical modern prime mover turbines employed in the power production industry have limitations of energy input into their shaft systems which are constrained by their turbines fluid properties and or the turbine fluid's enthalpy. In other words, steam, hydraulic, wind and combustion turbines are limited in their ability to produce power (rotating speed and torque) by way of the limiting properties of their working fluids.

As such, storage of energy generated by a turbine into a rotating mass is then limited by the fluid dynamic and thermodynamic constraints of the working fluids.

With the discovery of a constant thrust (force) production from a Asymmetric Radio Frequency Resonant Cavity a new classification of turbine (prime mover) and thus new method of an energy storage machine and system is permitted. This method and machine is described below written and forms the basis of claims for a new type of turbine.

Simply put, linear force acting at a tangent to a rotating shaft, whose force is of a constant nature, that does not separate or largely diminish itself from an imparted rotating mass as the rotating mass accelerates permits unceasing energy injection into said rotating mass. Hence, by way of the principles of force production from the asymmetric radio frequency resonant cavity, it acting as a linear force producing thruster, a new type of turbine is now created.

Said turbines rotating mass can couple to any type of conventional torque coupled system, like for example: a pump turbine, fan, blower, jet turbine, jack shaft, compressor shaft, flywheel, generator rotor, or any adapted shaft rotational assembly.

The application of the principle of constant force (or pressure) by way of the aforesaid thruster permits the invention, the "Rotating, Self-Excited, Asymmetric Radio Frequency Resonant Cavity Turbine, for Energy Storage & Power Production."

Present rotor-dynamic energy storage systems have an upper limit of internal energy in the form of rotating inertia. The principle limitation is that of the energy input method. Input energy to the rotors effective flywheel or rotating inertial mass is constrained in relation to that of the maximum input powers and or rotating speeds of modern prime movers.

Modern prime movers such as electric motors, fluid turbines, combustion turbines, rotating reciprocating engines, etc. all have the limitations of fluid impulse rate, reactive fluid pressure reduction, gaseous expansion, and or limited rotating electromagnetic field speeds. Again, the above-written limitations discussed.

To restate, the present art of prime mover construction and operation in the practical industry of power production is based on enthalpy consumption (reactive and impulse) to develop rotating power. This creates maximum rotational speed limitations on the rotating shaft system.

For motors it is the limitation of power available produced from another prime mover or potential energy source that limits rotational speed principally. For that of a synchronous motor the maximum rotating electromagnetic field frequency of the stator is a limiting variable in ensuring a limit to the motors rotational speed. As is the Current resistance losses in the motor.

The invention outlined utilizes a different type of thermodynamic process. One that utilizes the constant unceasing force generated from an asymmetric radio frequency resonant cavity thruster.

By use of the asymmetric radio frequency resonant cavity the thruster force developed is utilized to create an unceasing constant force acting against the rotors resistance and with the shaft systems existing rotating inertia. Accumulative energy injection into the systems rotor body then permits energy storage up to essentially the limitation of the rotors designed mechanical integrity.

A low power exciter input into the shaft system will result in time accumulated energy storage magnitudes beyond the present modern art. Energy can now be store in terms of rotating inertia in the shaft systems mass by way of the asymmetric radio frequency resonant cavities constant non-separating force production.

To elaborate further, the claimed invention differs in that modern industrial turbines are powered generally from, hydraulic or fluid potential energy and flow, or combustion gas expansion. These modern turbines all are limited in terms of shaft power output in terms of the working fluids pressure and velocity. This novel turbine will produce real work from the recently pier reviewed and vetted force generated by the Asymmetric Radio Frequency Resonant Cavity. As such, a force (and thus torque) of a constant nature, which does not separate itself from the imparted rotating mass will permit unceasing energy injection into the rotating elements of the shaft system.

The shaft system may now be also called a turbine in that it is prime mover utilizing the unconventional asymmetric radio frequency resonant cavities net force as essentially a permanently driven thruster.

The term thruster must be further specified in that the thruster employed for torque production in the invention differs from conventional thrusters that require fuel mass. Other classes of conventional thrusters such as ion thrusters and propellant powered thrusters require for their process a finite volumetric fuel or mass supply and are subject to the limitations of its working fluids and exhaust velocities. As a result of a finite fuel supply other thrusters utilized on a shaft system would have little design benefits in that the impulse imparted to the rotating shaft system would be over a relatively small time period only if independently fueled. Any permanently supplied mass fuel would also limit a rotor speed by virtue of it fluid dynamic properties. A microwave, radio or electromagnetic thruster, that which is an asymmetric radio or microwave frequency resonant cavity thruster is utilized in the invention. It is capable of doing real work and injecting energy to accumulate rotating inertia into the turbines rotating shaft system from relatively low electrical power source. It this said thrusters ability to apply constant non-separating force for long durations of time that permits the invention; Rotating, Self Excited, Asymmetric Radio Frequency Resonant Cavity Turbine.

The magnitude of rotating energy achievable from the turbine as bounded within the relatively small volume of the turbines body compared to conventional turbines referenced above can now be orders of magnitude greater than the modern art when comparing the turbines spatial volumes. The higher magnitude of energy density per machine volume of the invention is because of the higher speed it is capable of achieving utilizing the electromagnetic asymmetric radio frequency resonant cavity thrusters principle of constant non-separating force. This makes the invention well suited for use in power plants, and that of drive trains in vehicles.

The invention therefore an utilize low power inputs, often inexpensive in cost like during off hours of production, from an electrical source to essentially store energy in the form of rotating inertia which may later also be extracted quickly from the rotating mass. The invention is an improvement in that there is fundamentally almost no limitation in energy density capable of being stored in the rotating mass other than the governing mechanical integrity of the shaft rotating assembly and its associated constraint system.

The invention described utilizes also an adapted microwave generator such as an adapted Klystron tube assembly to amplify an electric power input signal into the asymmetric resonant cavity thrusters. This embodiment permits high powered microwaves or radio waves (Predetermined for specific designs) to be generated in a mechanically static fashion integrally attached to the rotating shaft system.

The virtue of the adapted Klystron tube embodiment is that the limitations of magnetron microwave power production and the necessary engineering needed to avoid dynamic force compensations to not destroy a magnetron on a rotating shaft system is fundamentally avoided.

The microwave generator, utilizing an adapted Klystron Tube embodiment also benefits the turbine in that microwaves may be generated in a more efficient means in terms of controllable heat production and that lower power input requirements are permitted via the Klystron Tubes inherit ability to amplify a low power input signal needed to generate thrust and a net force in said thrusters.

SUMMARY

Conventional rotor dynamics may be applied to construct a new classification of turbine that utilizes the force generated by the asymmetric radio frequency resonant cavity thruster, or adapted Electromagnetic Drive to achieve orders of magnitude higher energy storage and generation power potential than capable with the present prior art. Application of the thrusters principle of non-separating net force to a rotor body enables a new classification of turbine capable of orders of magnitude higher energy storage per volume of machine, in the form of rotational energy and inertia. The energy stored may also be removed from said turbine as to power any machine or device adapted and coupled to said turbine.

ADVANTAGES

This invention is an improvement on what currently exists in terms of flywheel energy storage and turbines in general as a prime mover. Presently modern industrial turbines are powered typically from: Working fluid flow, impulse or reaction forces generated when a fluid expand over the surfaces of typical turbine blades imparting an impulse and reaction force into a turbine rotors blades.

These Newtonian turbines all are limited in terms of shaft power output in terms of the working fluids pressure and velocity. This novel turbine will produce power (work) from the newly discovered force generated by Asymmetric Radio Frequency Resonant Cavity.

As such, a force (and thus torque) of a constant nature, which does not separate itself from the imparted rotating mass will permit unceasing energy injection into the rotating elements of the turbine shaft system.

With this novel application rotating energies will be achievable within a relatively small volume of space compared to conventional turbines referenced above.

Wherever there is a need for a high speed shaft, or large amounts of rotating inertia this invention can furnish this. It can also act a prime mover on a generator power train similar to steam turbines. This would apply to powering a machine, rotating a generators rotor for electric power production, and even to creating high energy high speed rotating electromagnetic fields, or torque coupled high speed rotating fluids like metallic liquid or gaseous state matter or plasma centrifuges. The main advantage being furnishing of ultra high rotational speed and rotational inertia available for consumption from coupled load.

DRAWINGS—FIGURES

FIG. 1. is a cross sectional diagram of the invention which shows a typical stationary and rotating assembly depicting the rotor arrangement that has been adapted to utilize the principle of thrust production from asymmetric resonant frequency cavity thrusters.

Figure 2:
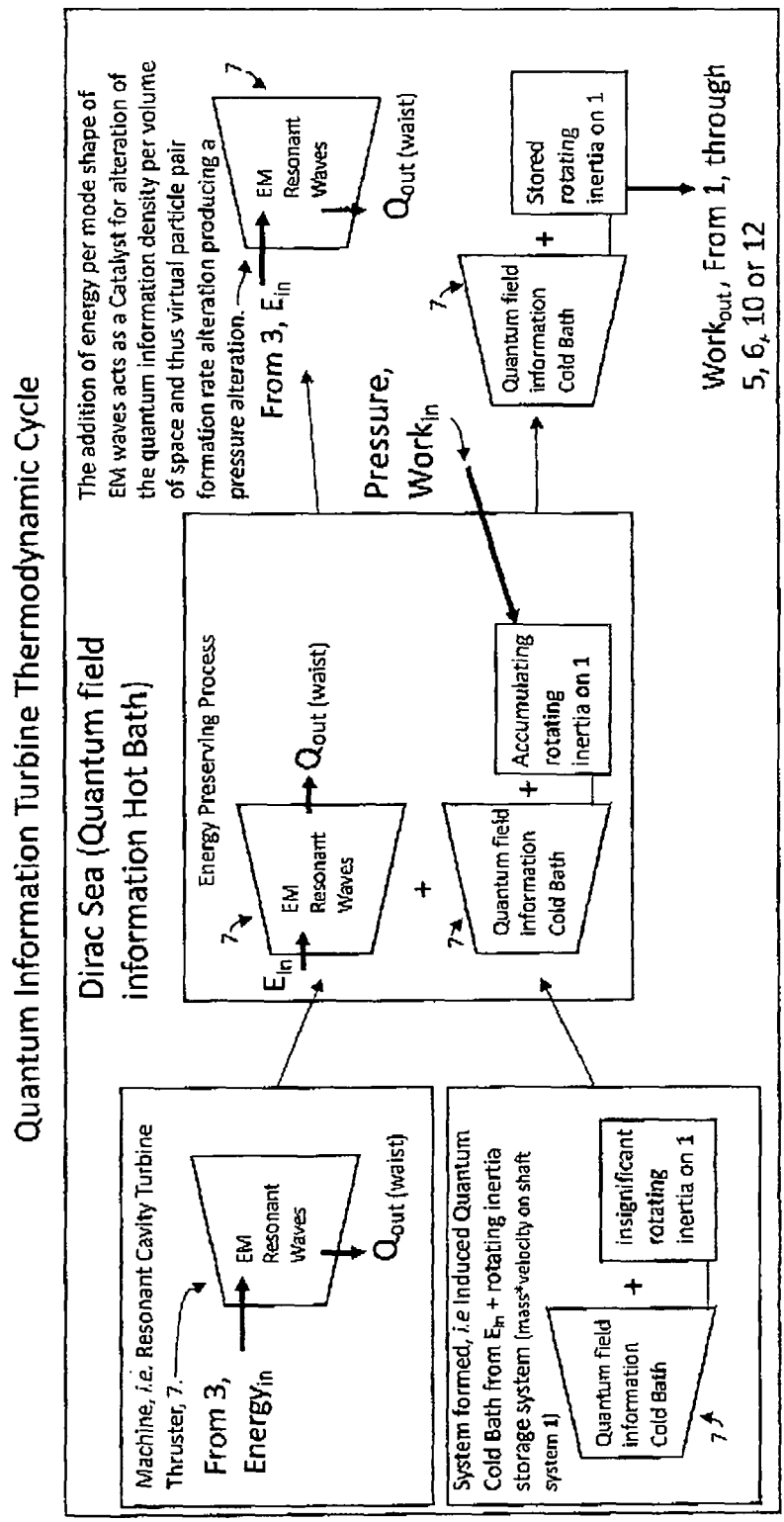

FIG. 2. is another embodiment of the turbine showing a thermodynamic explanation of how the turbine consumes energy to produce the prime moving force that permits the conversion of electrical energy into to an alteration of virtual particle formation rate like an extended Casimir Volume, where a volume of of space has modified its quantum information by charges of virtual particle pressures exerted on the immediate body of the thruster which results in an unceasing and constant pressure, so that the turbines resonant cavity thruster 7 body can accelerate the rotating shaft system 1 to unconventional rotating speeds with relatively little energy when compared to alternative present thermodynamic processes existing in modern turbine systems.

REFERENCE NUMERALS 1 shaft
2 rotor arm
3 microwave generator
4 cooling system
5 generator/motor rotor
6 generator/motor stator
7 thruster
8 thrust bearings
9 floating electromagnetic radial guide bearings
11 external excitation system
10 outside power supply interconnection
12 shaft coupling

DETAILED DESCRIPTION—FIG. 1—FIRST EMBODIMENT

FIG. 1 shows a cross sectional view of one embodiment of the asymmetric radio frequency resonant cavity turbine for energy storage and power production. Shown it the figure is a main shaft 1. Connected to the main shaft 1 are torque transfer mechanisms (Arms depicted, however can embody any typical arrangement such as a Hub or force coupled rotor body) 2. The arms 2 are linked integrally in terms of mechanical strength to the Asymmetric Radio Frequency Resonant Cavities 7. The cavities 7 are thrusters 7. Microwave generators 3 such as adapted Klystron Tubes 3 are connected to the thrusters 7 and feed the thruster 7 the necessary electromagnetic signal required for thrust production. The Microwave generators 3 are linked to obtain their electric power input from either the external power input excitation system 11 or from the existing rotating inertia of the shaft system through the generator/motor power circuit 5 and 6. The microwave generators 3, and thrusters 7 are cooled with a fluid cooling system 4. The whole rotating element is constrained in a typical manner, utilizing in this embodiment floating electromagnetic radial guide bearings 9, and a thrust bearing 8 for added stability. A coupling 12 exists on the shaft system direct drive transfer of torque also. Power input and output into the resonant cavity thruster is provided through the outside power supply 10, an excitation system 11, and through the motor generator stator 6 and rotor 5 system.

The thrusters 7 are the principle driving component of the rotating assembly. The thruster 7 is an electrically stimulated asymmetric radio frequency resonant cavity. They receive an optimized electromagnetic signal (microwave) from the custom designed microwave generators 3 such as adapted Klystron Tubes. The thruster 7 itself has an inner metallic body which reflects microwaves internally and creates resonant electromagnetic standing waves inside its optimized asymmetric cavity to produce a net force acting against the thrusters 7 body. Heat generated from the electromagnetic waves interacting with its metallic body are carried away using a fluid cooling system 4.

The thruster 7 may be of a fixed or variable inner geometry type whereby the inner geometry may be made larger or smaller on demand by mechanical means as requested from a typical governor control system for the intention of varying thrust output and controlling the thrusters 7 internal cavity geometry.

The adapted microwave generator assembly 3 takes an electrical power input and generates the optimized electrical signal necessary to maximize thruster 7 force development. The optimized signal may be predetermined to be in the microwave or radio frequency spectrum. The microwave generator assembly 3 is also cooled using a fluid cooling system 4. It will take the electrical input currents and amplify the power input into a powerful electromagnetic signal when coupled to thrusters 7 inner cavity. The microwave generator 3, with the embodiment depicted is shown as an adapted Klystron Tube assembly that is essentially a modified microwave generator 3 built custom to supply the resonant cavity thruster 7 with an optimized high energy field strength, power and frequency input signal. In the shown embodiment in FIG. 1, the microwave generator 3 is shown as an adapted Klystron Tube assembly. It is built similar to powerful (Megawatt Output Range and above) customary tube assemblies utilized in the television and radio broadcasting industries to obtain meaningful thrust production. The power output signal from the microwave generator 3 is set is support optimal thrust production in the thruster 7.

The shaft 1 will be designed using customary means to accommodate bending modes, stiffness requirements, design torques, torsional and bending fatigue, etc. Its principle purpose is to transfer torque to a torque converter and carry the rotational assembly. Coupled to the shaft are the rotor arms 2 which carry the microwave generator 3 and thruster 7.

The cooling system 4 will be designed using customary means to carry heat away from the power electronics on the rotating assembly, namely the thrusters 7, generator 5 and 6 and microwave generator assemblies 3. A liquefied gas, or custom optimized fluid may be used to absorb heat by pumping or simply centrifugal pumping and evaporative cycle built integrally into the rotating elements. Other cooling methods such as Focused Laser Cooling may be applied instead. Many well known specific methods of cooling system 4 methodologies may be utilized to keep the power electronics and system cooled.

The generator/motor, consisting of its Rotor 5 and Stator 6 serves several purposes. It provides starting torque for the machine to overcome static friction and inertia during a start up. It acts as a connection from an external power source to provide power input to the microwave generator 2 as to power the thrusters 7 during a rotor energy injection mode. It can be run as generator during generate mode. It can also self excite the microwave generator 3, utilizing a typical adapted regenerative braking methodology and an excitation transformer system 11.

The floating electromagnetic radial guide bearings 9 and thrust bearing 8 act to constrain the rotational assembly in a typical manner with known rotor dynamic theory. A choice of floating electromagnetic bearings is customary for reducing friction losses and permitting high speed rotation of the rotating assembly. Any bearing system can however be utilized to constrain the shaft 1 rotating assembly.

DETAILED DESCRIPTION—FIG. 2

FIG. 2 involves displacement of virtual particle pal as outlined in terms of a thermodynamic process to produce torque on the turbines shaft system for purposes of power generation or energy storage. By introduction of high energy resonant electromagnetic waveforms which are superimposed on each other inside a resonant cavity sympathetic to said inputted waveforms, an uncertainty in the local space-time is created whereby the energy and thus information alteration from the electromagnetic wave's energy in that space does not permit virtual particle waveform pairs to spawn into creation. This is similar to how in general, matter tends to not exist where other matter already is. As such, when an electromagnetic energy is inputted into the resonant cavity thruster body, by means of microwave radiofrequency signal generators also called emitters or cathodes-anodes tube arrangements, the information density of the local spacetime along the body of the thruster is altered, thereby producing a cold sink to the Dirac sea's hot sink of chaotic virtual particle pair pressures. As such, a modified Casimir type volume is artificially created by the resonant cavities large energy input and quantum virtual particle pressure is impressed or impounded upon the asymmetric cavity body, resulting in a net force production which is then described in detail acting upon the machine throughout this document.

Operations—FIG. 1

A manner of using the invention is to utilize it in a scheme very similar to that of a typical hydraulic pump/turbine energy storage plant. With the invention energy is stored in the rotating shaft 1 assemblies' mass, (or a coupled flywheel to the invention) rather than in a fluid at an elevation above a said hydraulic pump/turbine.

Modes of Operation. There is an energy storage operation mode, a generate energy mode, which removes energy form the rotating assembly, and idle mode where energy stored in the rotating mass is maintained as the invention waits to be called to dispatch energy from its rotating inertial reserve.

To store energy into the machine, an excitation or low power input signal is fed into the shaft generator rotor 5 from an external source. This is typical for power machines and is often done through means of a collector ring assembly, that is known to be an integral subsystem to the generator 5 and 6. The Microwave generator assembly 3 is then energized by the signal, and then subsequently provides a power input to the thruster 7. The thruster 7 then develops a force and torque which rotates the shaft 1 system to a desired rotational inertia.

The magnitude of energy being stored and rotor speed/acceleration curves for storing this energy on 1 are essentially unique in that mathematically the principle limitation of the inventions rotating energy is dependent on its rotating assembly's mechanical integrity design limit chosen to resist forces generated by its unconventional ultra high rotating speeds.

To generate energy from the machine either the integral generator rotor 5 can be self-excited in a typical permanent magnet generator fashion or a coupled counter torque can be applied by means of a torque converter coupled to the shaft 1 to recover the rotating energy.

To maintain a desired rotational energy an idle ode of operation may be employed by simply exciting the thrusters 7 on a desired duty cycle to offset inherent losses of friction acting against the rotating shaft 1 assembly.

A variation of generate mode called self-excited power mode may be employed whereby the rotating energy of the shaft system 1 may be sapped by the generator 5 and 6 and used to drive the thrusters 7 to produce a counter torque. This can be done also to maintain heating of the power electronic drive system 3 and 7 or to warm up the machine.

CONCLUSION, RAMIFICATIONS, AND SCOPE

Accordingly the reader will see that the invention described creates a new way to store immense magnitudes of potential energy over a relatively low period of time from a relatively low power electrical input. The energy may quickly be tapped or withdrawn by means of coupled torque converter device. This permits fast withdrawal of energy and can provide an electrically coupled electricity load grid with electric frequency and Volt-Ampere Reactive stability.

The specific speed and large magnitudes of power available in the asymmetric radio frequency resonant cavity turbine after it has been charged with energy to high predetermined limits will permit entirely new classifications of rotating equipment. For example, new adapted high speed matter centrifuges, high energy matter projectiles, high speed gyro inertial stabilizers, high speed drills, high speed of matter impact plasma injection drills for civil works, vacuum boosters capable of recovering gaseous atoms in a vacuum, MegaVolt, and even GigaVolt static electricity generators, fluid matter supercavitation machines, ultra-high speed particle and photon exposure panel apertures, ultra-high pressure matter compression machines, all represent the potential of a new industry of ultra-high speed rotating equipment.

Finally, the turbine will permit the development of a large scale energy storage infrastructure where gigawatt hour magnitudes of energy storage facilities will be permitted en mass, at relatively low costs once commercial production prototypes are constructed. These storage facilities will not require the large scale chemical and heavy metal volumes of a comparable chemical battery or fuel cell type energy facility. They will also be able to furnish real power to the nations electrical grid with frequency control and mechanical rotating reserve.

The invention is an improvement on present flywheel energy storage schemes, in that the effective flywheel, the rotating shaft assembly, can be now be sped up to ultra-high predetermined speeds, far beyond where presently employed machines in industry perform. The asymmetric radio frequency resonant cavity turbines speed will not be limited to the well known typical speed limitations of prior art prime movers.

The invention is what can be referred to as a Quantum Information Turbine. The Quantum Information Turbine is as simply put a novel form of prime mover that utilizes disruption in virtual particle pairing in spacetime to generate thrust by way of thermodynamic process utilizing the Dirac Seas particle production rate as a Hot Bath. Alteration of the Dirac seas information density and pairing rates permit the invention to be able to store energy. Energy input into the inventions resonant cavity thrusters causes a difference in virtual particle pressure on the body of the thrusters. Manipulation of the zero-point energy pressures, also known as quantum pressures in the Dirac Sea, is performed as to convert electrical energy input into meaningful force generation to produce rotating energy. This extended Casimir effect affords the ability to create localized alterations of virtual particle pairing and thus pressure felt by any involved body, namely the thrusters local surfaces. Work produced by the invention as above described is then is stored as energy in the form of rotating inertia which can then be used to generate electricity. Therefore, allowing for a Quantum Information Turbine or as more exactly titled a Rotating Self-Excited, Asymmetric Radio Frequency Resonant Cavity Turbine for Energy Storage and Power Production.

Although the description above contains many specificities, these should be not construed as limiting the scheme of the rotating elements of the shaft system or the stationary elements. A speed governor, electrical excitation system, cooling fluid system, generator interconnection or torque converter, and brake system are typical elements of an adaptation to make the functional invention itself integrate with a typical power production facility or shaft torque scheme which is considered typical.

Thus the scope of the embodiment should be determined by the appended claims and their legal equivalents also, rather than by the examples given alone.

I claim:

1. A rotating machine that is propelled by the net force created from a rotating shaft assembly comprising:
    an asymmetric electromagnetic resonant frequency cavity thruster powered by an electromagnetic microwave radio frequency generator designed for inputting high energy sympathetic resonating electromagnetic signals into said resonant cavity thruster, where the microwave generator is powered from an outside power source which also can accept to be powered during a separate mode of operation by a coupled rotating electromagnetic generator utilizing a regenerative braking system coupled to the rotating shaft systems rotating mass, utilizing a fluid coolant system maintaining predetermined thruster temperatures for increasing the net force generated from the resonant cavity thrusters body;
    all constrained in an average in the art rotor dynamic arrangement utilizing floating electromagnetic radial bearings,
    all contained in a housing utilizing an environment of near vacuum atmosphere or low density gas media, whereby said rotating machine is used to perform energy storage and reversibly used to perform power generation by storing said inputted electromagnetic energy signals in the terms of an accumulated rotating inertia into said shaft assembly and is operated as an effective energy storage reservoir by utilization as a power generation machine as demanded by outside coupled loading through the motor generator system.

2. A rotating energy storage machine that is propelled by the net force created from a rotating shaft assembly comprising:
    a plurality of asymmetric radio frequency resonant cavities that receive power input signals from a plurality of Klystron Tube microwave generators geometrically designed for inputting sympathetic resonating electromagnetic signals into said thruster resonant cavities, where the microwave generators and subsequent thruster resonant cavities receive power from an outside power source whereby upon rotational acceleration energy is stored into the machines rotating element in the form of rotating inertia, allowing the machine to be utilized as an energy storage machine in a flywheel scheme and thus act as a reservoir of energy if called upon as a power generation machine to output said stored power through the motor generator set up or through direct coupling to the machine.

3. A method for production of torque into a rotating shaft system for storage of usable rotational rotating energy done by the amplification of electromagnetic energy signals from microwave generators, that supply sympathetic resonating electromagnetic signals into an asymmetric radio frequency resonant cavity thruster or plurality of resonant electromagnetic cavities as to produce a consistent tangential non-separating force of constant magnitude acting to rotate the entire shaft system to, high levels of velocity to store rotational energy that is retrievable through regenerative braking torque retrieval processes;
    wherein said microwave generator is an adapted Klystron Tube which inputs microwave signals into an asymmetric radio frequency resonant cavities to produce an alteration of the local quantum field information fluctuations as to alter virtual particle pairing surface pressure on the thrusters body as to change the immediate quantum fields information density per volume of thruster body on the thruster body where a net thrust is generated that is proportional to the increase of power input into the asymmetric radio frequency resonant thruster body from the Klystron Tubes power supply feed which is fed from an outside power source into the rotating shaft system.

4. The method of claim 3 wherein said rotating shaft system is constrained by floating electromagnetic radial guide bearings with programmable bearing stiffnesses to allow control and guidance positioning of the shaft system radially and axially to accommodate the many shaft modes generated by the ultra-high speed shaft system as the shaft system changes its rotating velocity when charging the shaft system with rotating inertia and when discharging it.

5. The method of claim 3 wherein said microwave generator receives a power input signal through a reversible generator motor assembly coupled to the main shaft which is fed from an outside power signal source for the purpose of using the outside power to be converted to rotational energy through use of the anomalous thrust produced by the asymmetric electromagnetic resonant cavity thruster device for the purpose of storage and dispatching of said energy.

6. The method of claim 3 wherein an electromagnetic input signal originating from the microwave generator creates super-positioned sympathetic resonating standing electromagnetic waves inside the resonant cavity thruster's inner volume as to generate a net force output acting on the body of the asymmetric electromagnetic radio frequency resonant cavity thruster as to provide torque to the shaft system resulting in a time accumulated storage of rotation mechanical energy provided by an outside power source or electricity grid that converts electric power into net thrust production on the rotating shaft system.

7. A rotating machine for storing and dispensing rotating energy comprising:
    a. A rotating shaft assembly for enabling the rotational coupling of;
        an asymmetric radio frequency resonant cavity thruster, a microwave generator that creates super-positioned sympathetic resonating standing electromagnetic waves inside the resonant cavity thruster's inner volume, an excitation and generation capable generator motor rotor assembly, an excitation and generation capable generator motor stator assembly, a geometrically positioned rotor arm and shaft coupling whose electrical power equipment is electrically coupled and carried in rotational motion by said shaft, b. A single or plurality of said thrusters geometrically predetermined for maximum torque creation on the shaft system created by function of the asymmetric radio frequency resonant cavities that receive a predetermined supply of sympathetic electromagnetic signals from said microwave generators as to produce resonant electromagnetic waves inside the resonant cavity that then produce a net force effect of a non-separating unceasing consistent force from the thruster acting at a torque arm with at increasing speed function that is applied tangentially to said rotating shaft assembly, where thruster force operation relies on the net prevention of quantum virtual particle pair formation inside and on the surface of the asymmetric cavity walls by means of alteration of the local volume of spaces quantum field information density in the free space inside the cavities body and immediately adjacent to the structure of the cavity and at the nodal points and crests of the resonant cavities electromagnetic waves inside and just outside of the asymmetrical electromagnetic wave resonant cavity body, c. A single or plurality of said microwave generators consisting of Klystron Tubes which produce resonating electromagnetic signals to input into and excite said resonant cavity thrusters as sympathetic resonating electromagnetic signals which extend a Casimir effect onto the resonant cavity body's surface, d. A structural coupling of said microwave generators, said resonant cavity thrusters, net force from the thrusters, where the thrusters force acts to rotate axially said rotating shaft assembly, and its mass, e. An electric circuitry that takes the electrical power signals from an outside stationary power source to said rotating motor generator and from said motor generator to said microwave generators for the purpose of transformation of electrical power input into stored rotational inertia on the shaft system at speeds not possible with conventional mass flow and reactionary turbines or motors made possible by the constant unceasing net thrust developed by the quantum vacuum variations generated on the thrusters body, f. A motor generator that transfers rotational energy from the rotating shaft assembly to said generator's output through regenerative braking as to power the microwave generators that then excite the resonant cavity thrusters to create a consistent non-separating force acting at a tangent to said rotating shaft assembly, g. A shaft coupling for the transfer of the shaft systems rotational energy from said rotating shaft assembly to an outside counter torque load, made by either friction or shear onto the outside torque receiver coupling interface, h. An electromagnetic bearing system which constrains the rotating assembly with floating electromagnetic radial guide bearings and an axial thrust force bearing, whereby said rotating machine may be controlled and operated to store inputted electrical energy signals in the form of time accumulated rotational energy into said rotating shaft assembly or output rotational energy to a coupled torque or electrical load as per a flywheel scheme.

* * * * *